United States Patent [19]

Crus et al.

[11] Patent Number: 4,716,528
[45] Date of Patent: Dec. 29, 1987

[54] METHOD FOR MANAGING LOCK ESCALATION IN A MULTIPROCESSING, MULTIPROGRAMMING ENVIRONMENT

[75] Inventors: Richard A. Crus, San Jose; Donald J. Haderle, Los Gatos; Howard W. Herron, San Jose, all of Calif.

[73] Assignee: International Business Machines Corporation, Armonk, N.Y.

[21] Appl. No.: 825,508

[22] Filed: Feb. 3, 1986

[51] Int. Cl.$^4$ .............................................. G06F 9/46
[52] U.S. Cl. .................................................. 364/300
[58] Field of Search ................. 364/200 MS File, 300

[56] References Cited

U.S. PATENT DOCUMENTS 4,574,350  3/1986  Starr .................................. 364/300

Primary Examiner—Raulfe B. Zache
Attorney, Agent, or Firm—R. Bruce Brodie

[57] ABSTRACT

A method utilizing a coordinated pair of locking limits for managing concurrency and lock granularity tradeoff relations. A first limit is placed on the number of small granularity locks per resource. A second limit is placed on the number of locks assignable to each process. When the first number of small locks is reached, the method withdraws the small locks and grants only one lock to the entire resource (lock escalation). When a process requests an additional lock over the second limit, the lock is refused.

5 Claims, 3 Drawing Figures

PAGE LOCKS COMPARED TO TABLE SPACE LOCKS

RELATIONAL DATABASE APPLICATION
PREPARATION AND EXECUTION (OVERVIEW)
ACCORDING TO THE PRIOR ART

A HIERARCHY RELATIONAL DATABASE OBJECT

PAGE LOCKS ALLOW CONCURRENT ACCESS BY SEVERAL USERS

A TABLE SPACE LOCK MAY RESTRICT ACCESS TO ONE USER

PAGE LOCKS COMPARED TO TABLE SPACE LOCKS

METHOD FOR MANAGING LOCK ESCALATION IN A MULTIPROCESSING, MULTIPROGRAMMING ENVIRONMENT

TECHNICAL FIELD

This invention broadly relates to resource and lock management in a multiprocessing environment, and more particularly to the management of lock escalation and concurrency in such an environment.

BACKGROUND

It is well known that the lock manager portion of an operating system in a multiprocessing environment assigns and reassigns locks on resources on behalf of processes. This activity may result in a decrease in information processing throughput by frequent locking of a resource which has a very high concurrency requirement; that is, one in which a large number of processes are concurrently operable. This requires the lock manager to in effect manage the contention; that is, take processing time to lock, unlock, and resolve wait and resume conditions.

One important class of multiprocessing, multiprogramming systems is relational data base management systems. In a relational data base, data is perceived to exist in one or more tables. Each table consists of a specific number of columns and a number of unordered rows. Each column in a row is related in some way to the other columns. Significantly, a relational data base manager accesses data by referring to its content instead of its location or organization and storage. While the rows of a relational table have no fixed order, the order of the columns however will always be the order in which the columns are defined within the table definition.

A relational data base management system includes a query language as, for example, the IBM language SQL/DS described in "SQL/Data Systems Concepts and Facilities Manual", IBM Publication GH24-5065, copyright 1984. SQL (Structured Query Language) is a system data sublanguage including both a data definition component and a data manipulation component. The language is of a declarative form in which the commands create, alter, destroy, or manipulate objects leading to the relational data base manager to formulate an optimum instruction path to execute the command.

Because a relational data base manager is set in the context of concurrent processing, it utilizes facilities such as lock managers. In this regard, the current state of the art is represented by C. J. Date, "A Guide to DB2", Addison-Wesley Publishing Co., copyright 1984, pp. 191–195; C. J. Date, "An Introduction to Data Base Systems", Addison-Wesley Publishing Co., copyright 1986, pp. 422–427; and Chamberlin et al, "A History and Evaluation of System R", Communications of the Association of Computing Machinery, October 1981, pp. 632–645. These references collectively disclose lock escalation in a relational data base system, including a table-based lock escalation mechanism involved with the language SQL/DS. This technology adjusts locking granularity in response to accessing experience.

Generally, in multiprocessing systems, and data base management systems in particular, a problem arises in that there are alternative protocols for efficiently managing escalation of a locking protocol on a resource from a small granularity lock to a big granularity lock when the number of small granularity locks held on a resource reaches a specified limit.

The Chamberlin reference points out that when a user accumulates many small locks, they may be "traded" for a larger lockable unit. For example, locks on many records in a table might be traded for a lock on the table.

THE INVENTION

It is an object of this invention to enhance information throughput in a system supporting execution of asynchronous concurrent processes. It is a related object to devise a method for efficiently managing the concurrency and lock granularity among asynchronous concurrent processes and shareable resources. It is yet another object to devise such a method for particular use in a relational data base management system.

The foregoing objects were unexpectedly satisfied by a method utilizing a coordinated pair of limits. A first limit is placed on the number of small granularity locks per resource. A second limit is placed on the number of locks assignable to each process. When the first limit is reached, the method automatically escalates the lock size on a resource from a small granularity lock to a larger granularity lock. Upon a process requesting an additional lock which would take it to the second limit, said lock is not granted. This may cause a requesting process to be terminated. As a result, the invention balances concurrency and performance in the access to or referencing of a resource within a given amount of virtual storage available to hold locks.

It is conceded that the cited prior art collectively discloses lock escalation in a relational data base system including a table-based lock escalation mechanism. It is further conceded that it is old technology to adjust locking granularity in response to accessing experience. However, it is believed that the art neither teaches nor suggests a method in which a lock escalation limit by tablespace and a page lock limit by process provides greater control in managing concurrency and lock storage. That is, any multiprocessing system whose resources and processes are governable by locks of varying granularity can beneficially utilize the method of this invention.

DESCRIPTION OF THE PREFERRED EMBODIMENT AND INDUSTRIAL APPLICABILITY

Locking in a Relational Data Base System

Concurrent access to data in a relational data base system is controlled primarily by locks on tablespaces and indices. Locking should be required on every tablespace that is accessed by the manipulative verbs in the data accessing language. In SQL/DS, these include the SELECT, UPDATE, INSERT, or DELETE statements. In addition, locking should be required on index pages if page locking is in effect and an index path is chosen to access the data, or if an index key column in the data is modified.

It should be appreciated that tablespaces connote a logical or physical storage extent within which tables reside. Each tablespace has a maximum addressable range and may comprise one or more of preferably VSAM data sets. Tablespaces are divided into equal-sized units called "pages".

When a tablespace is locked, there are two possible locking protocols which may be specified. These are (1) tablespace locking in which the entire tablespace is locked on behalf of one process and can only be accessed by other processes which hold compatible tablespace locks, and (2) page locking in which only the individual pages accessed are locked on behalf of one process and the remaining pages (those that are not locked) can be accessed by other processes. Parenthetically, indices utilize the same locking protocol as the tablespace containing the table on which the index is created. Consequently, in the case of updating, tablespace locking provides dedicated access to the tablespace and all of its indices by one process, whereas page locking provides concurrent access to the tablespace and its indices by multiple processes.

Considerations of Performance

Each time a lock is acquired, changed, or released in a relational data base there is a definite performance penalty in terms of execution path length through the lock manager. Additionally, while a lock is being held, a predetermined amount of virtual storage is occupied. Thus, while page locking provides greater concurrency than tablespace locking, it is much more performance and storage costly by a factor of the number of pages accessed. The selection of a locking protocol is thus a tradeoff in concurrency and performance in storage.

Figure 1:
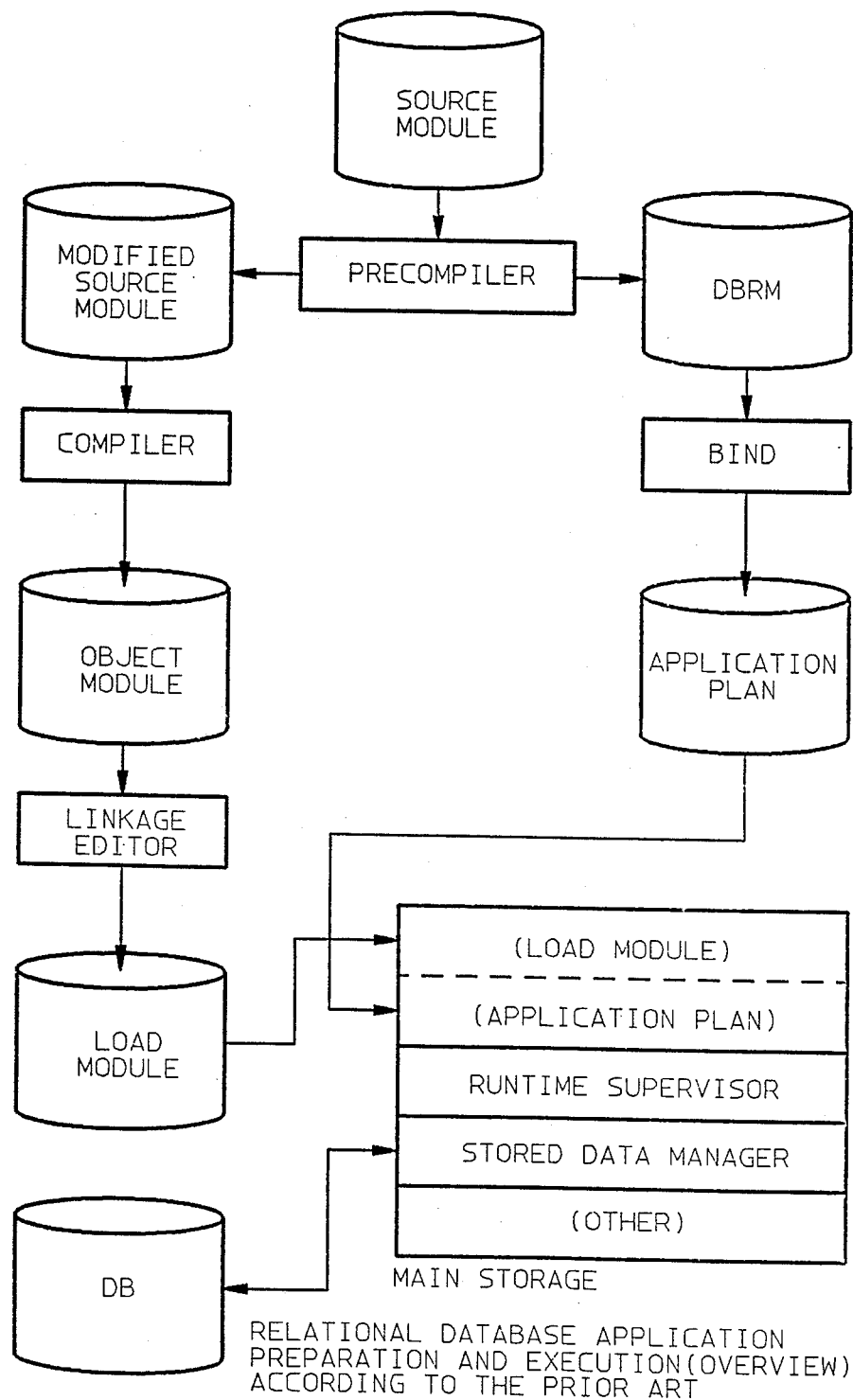
FIG. 1 shows an overview of preparation and application of a relational data base instruction stream according to the prior art.
Figure 2:
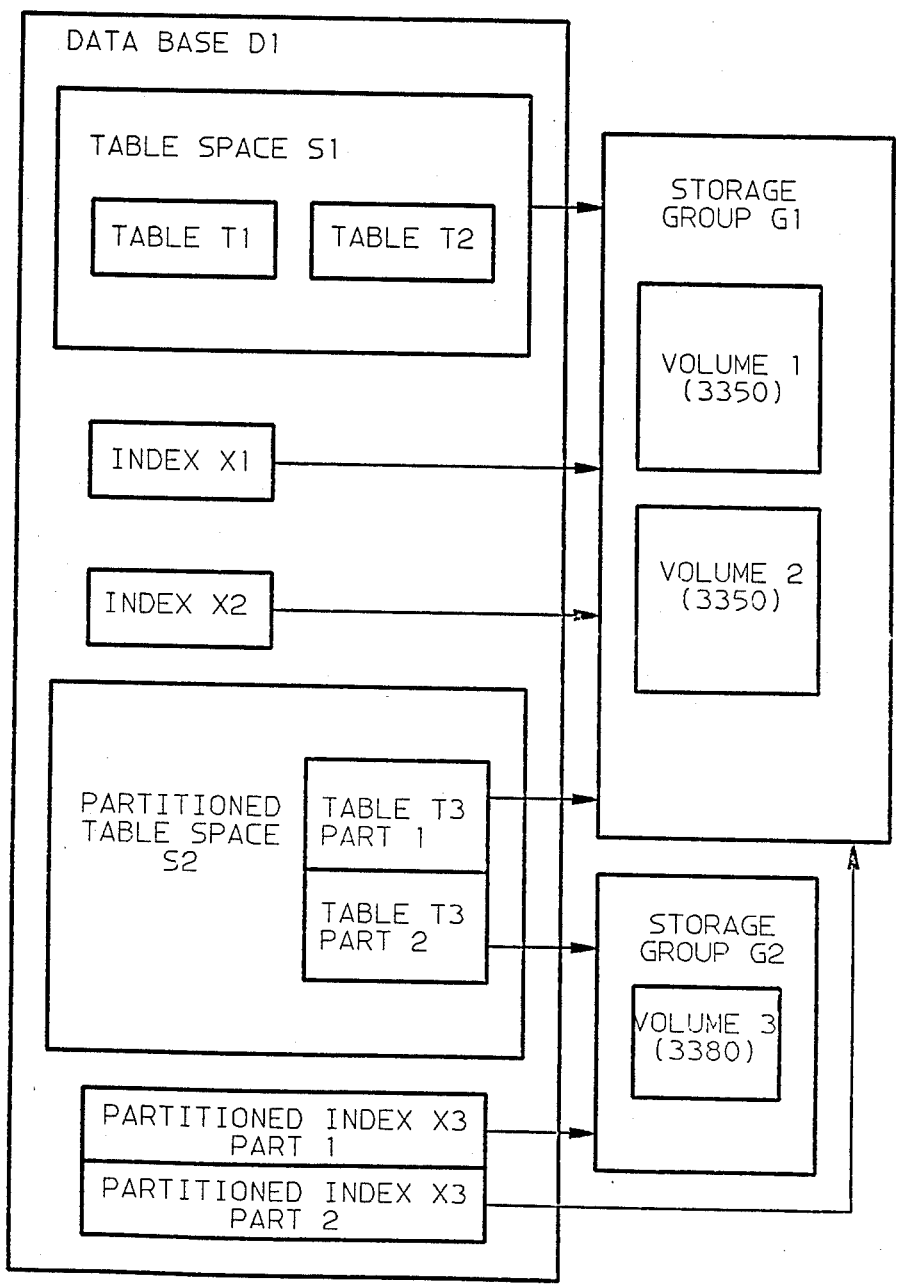
FIG. 2 shows a hierarchy of objects in a typical relational data base system.

Referring now to FIG. 1, there is shown the activity sequence in which relational data base definition and accessing statements embedded in an application are parsed out of the application string and processed in a compiler-like manner to form accessing modules. FIG. 2 shows a hierarchy of objects that are the constituent elements of a relational data base. These include a collection of tables and associated indices, as well as the tablespaces in which the tables and indices reside. When a tablespace is created, the data base to which a table belongs and the storage group it uses are identified. In the absence of an application specified data base and storage group, relational storage managers typically utilize a default base and storage group.

Figure 3:
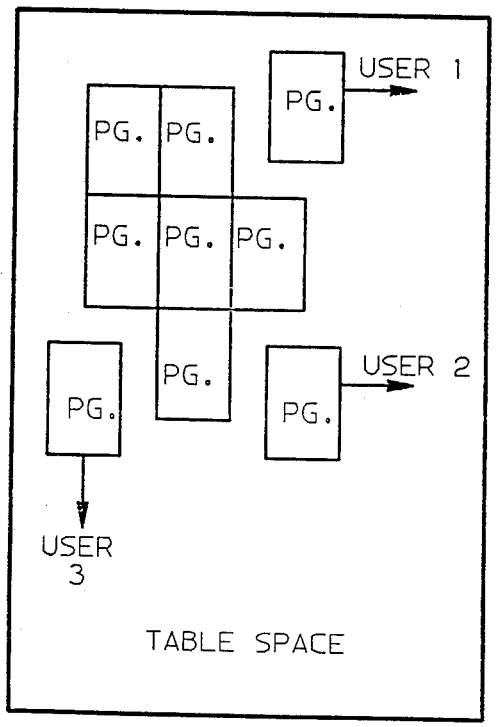
FIG. 3 shows page locks compared to tablespace locks.
Figure 3:
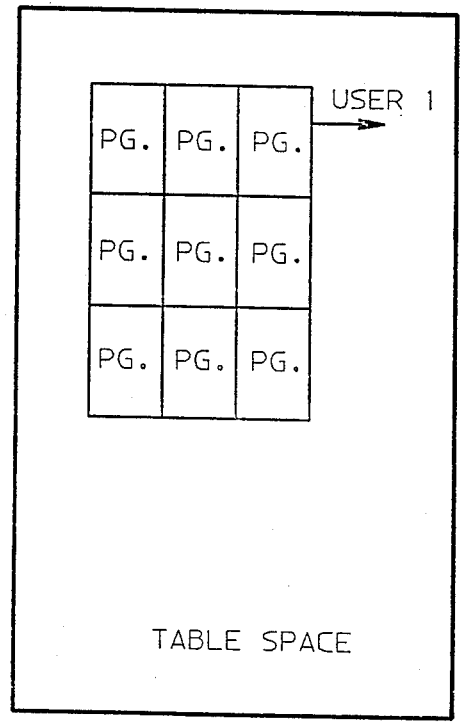

Referring now to FIG. 3, there is shown a syntax of a tablespace definition statement. This includes a lock size which is the size (granularity) of locks held on a tablespace.

In a typical relational data base system without lock escalation, LOCKSIZE (ANY) is usually an instruction to the data base manager to convert to tablespace locking. When a series of data base statements is being processed in a compile-like mode termed "binding", there is uncertainty as to how many page locks may have to be acquired and held in order to process the data base request. Too many page locks held concurrently by multiple users could cause virtual lock storage capacity to be exceeded, resulting in a catastrophic situation. To avoid this, tablespace locking is chosen to limit the amount of storage needed for holding locks. With lock escalation, page locking is selected as the locking protocol since an escalation to tablespace locking during execution can be made if necessary.

During the execution of a process which is accessing a tablespace of LOCKSIZE ANY, the relational data base system preferably keeps count of the total number of page locks that are concurrently held against the tablespace. When that count reaches the lock escalation limit value as specified at the CREATE TABLESPACE time, the data base manager dynamically escalates the locking protocol on the tablespace from page to tablespace locking. Also, it does not obtain any more page locks. Further, page locks already held are released. In this circumstance, lock escalation is performed only for the process that has hit the limit. The remainder of the execution of that process against the LOCKSIZE (ANY) tablespace is run under the tablespace lock. If the lock escalation limit is never reached, page locking remains in effect for the tablespace for the entire execution of the process.

The following paragraphs relate to pseudo-code sequences illustrating the flow of control for the method steps of the invention. These sequences are, respectively, selecting the lock granularity of a resource, monitoring usage of the resource, escalating the locking protocol on the tablespace, refusing a lock over the process limit, and production of page lock statistics.

Selecting the Lock Granularity of a Resource

The following pseudo-code shows how implementation of the method of the invention selects the locking protocol for a tablespace as a function of the SQL operation being performed and the LOCKSIZE parameter that was specified for the tablespace.

```
CASE SQL SELECT or SQL INSERT subquery
     or SQL UPDATE or SQL DELETE.
   SUBCASE LOCKSIZE TABLESPACE.
     Lock_protocol is 'tablespace'.
        /= always respect LOCKSIZE TABLESPACE =/
   ENDSUB.
   SUBCASE LOCKSIZE PAGE or LOCKSIZE ANY.
     IF ISOLATION level is repeatable read
        and a tablespace scan is required THEN
        lock_protocol is 'tablespace'.
        /= escalate lock now =/
     ELSE
        lock_protocol is 'page'.
   ENDSUB.
ENDCASE.
CASE SQL INSERT row or SQL UPDATE where current of
     or SQL DELETE where current of.
   SUBCASE LOCKSIZE TABLESPACE.
     Lock_protocol is 'tablespace'.
        /= always respect LOCKSIZE TABLESPACE =/
   ENDSUB.
   SUBCASE LOCKSIZE PAGE or LOCKSIZE ANY.
     Lock_protocol is 'page'.
   ENDSUB.
ENDCASE.
```

In the above code, the lock_protocol variable is kept in the runtime control structure that represents the use of the tablespace by the process.

In the invention, the implementation selects the page locking protocol (highest level of concurrency) unless the user has explicitly specified a tablespace locking protocol (by LOCKSIZE TABLESPACE), or page locking protocols would be inconsistent with the expectation of tablespace use, i.e. the SQL operation being performed requires a tablespace scan with data locked until commit, which would be extremely inefficient with page locking protocols.

Monitoring Usage of the Resource

In the pseudo-code that follows, the variables tablespace_running_page_lock_count and tablespace_maximum_page_lock_count are kept in the runtime control structure that represents the use of a given tablespace by a process. When the tablespace is allocated to the process at the start of process execution, these two counters are initialized to zero. Thereafter, the tablespace_running_page_lock_count is maintained to reflect the actual number of page locks concurrently held against the tablespace by the process at any point in time. The tablespace_maximum_page_lock_count is maintained to reflect the maximum number of page locks that were concurrently held in the tablespace by the process during the life of its execution.

The variables process_running_page_lock_count and process_maximum_page_lock_count are kept in the control structure that represents the process during execution. When the process is allocated, these two counters are initialized to zero. Thereafter, the process_running_page_lock_count is maintained to reflect the total number of page locks concurrently held across all tablespaces at any point in time. The process_maximum_page_lock_count is maintained to reflect the maximum number of page locks that were concurrently held by the process during the life of its execution.

The variable tablespace_lock_escalation_limit is kept in the runtime control structure that represents the use of a given tablespace by a process. When the tablespace is allocated to the process at the start of process execution, this variable is assigned the value that was specified by the LOCKSIZE parameter on the CREATE TABLESPACE statement, or the default value from the IRLMLKTS installation parameter, as explained above.

The variable process_page_lock_limit is kept in the control structure that represents the process during execution.

When the process is allocated, this variable is assigned the value that was specified by the LOCKLIMIT parameter on the BIND command, or the default value from the IRLMLKUS installation parameter, as explained above.

The pseudo-code shows the steps taken to track the page locks held by tablespace and by process. This code is executed following return from the lock manager (IRLM) for every page lock request. If either the tablespace lock escalation limit or the process page lock limit is reached, an out-of-line branch is taken to another procedure to perform the appropriate action.

```
/= Page lock request =/
IF page_lock was acquired THEN
  DO.
    Increment tablespace_running_page_lock_count.
    /= Test and record new page lock maximum for
       tablespace =/
    IF tablespace_running_page_lock_count is greater
         than tablespace_maximum_page_lock_count THEN
       tablespace_maximum_page_lock_count equals
         tablespace_running_page_lock_count.
    Increment process_running_page_lock_count.
    /= Test and record new page lock maximum for
       process =/
    IF process_running_page_lock_count is greater than
         process_maximum_page_lock_count THEN
```
```
       process_maximum_page_lock_count equals
         process_running_page_lock_count.
    IF tablespace is eligible for lock escalation
         and tablespace_running_page_lock_count equals
         tablespace_lock_escalation_limit THEN
       CALL lock_escalation procedure(tablespace).
    ELSE /= no lock escalation =/
       IF process_running_page_lock_count equals
         process_page_lock_limit THEN
         CALL lock_resource_unavailable procedure(page).
  END.
/= Page unlock request =/
IF page_lock was released THEN
  DO.
    Decrement tablespace_running_page_lock_count.
    Decrement process_running_page_lock_count.
  END.
```

The following analysis should clarify the pseudo-code steps:

Page Lock Request

If a new page lock is acquired, then the appropriate tablespace page lock counter and process page lock counter are incremented to reflect the holding of this lock.

If either new tablespace or new process page lock maximums are reached as a result of acquiring this lock, then the appropriate maximum counters are updated to record the new maximums.

If lock escalation applies to this tablespace, then the updated tablespace page lock counter is tested against the tablespace lock escalation limit. If equal, an out-of-line branch is taken to a separate procedure to perform the lock escalation. If escalation is successful, program execution returns to continue with the next instruction after this passage of code.

If lock escalation does not apply or the limit has not been reached, then the updated process page lock counter is tested against the process page lock limit. If equal, an out-of-line branch is taken to a separate procedure to identify the lock as an unavailable resource, which in turn initiates termination of the process.

Page Unlock Request

If the page lock is released, then the tablespace page lock counter and process page lock counter are both decremented to reflect that this lock is no longer held.

Escalating the Locking Protocol on the Tablespace

The following pseudo-code shows the steps taken to escalate the locking protocol on the tablespace.

```
Lock_escalation: PROCEDURE(tablespace) escalate the lock
     on tablespace.
  Determine the lock_state to be escalated to.
     /= shared or exclusive =/
  CHANGE lock_protocol from 'page' to 'tablespace'.
     /= If exclusive lock is requested, this process will
        have to wait until any concurrent processes use of
        the tablespace is done =/
  Flag that a tablespace size lock has been acquired.
     /= prevents further page locking of the tablespace by
        this process =/
  Release all page locks held on the tablespace.
  Decrement the process_running_page_lock_count by the
     tablespace_running_page_lock_count.
     /= to account for locks released =/
  Reset the tablespace_running_page_lock_count to zero.
```

```
-continued
RETURN to next sequential instruction in calling module.
END lock_escalation procedure.
```

Once lock escalation has occurred, the process running page lock count is reduced by the number of page locks that were released, which is the number contained in the tablespace running page lock count. The latter is then reset. When normal program execution resumes, page locks will no longer be requested in this tablespace because all page locking code is conditioned on the locking protocol.

Refusing a Lock Over the Process Limit

The following pseudo-code shows the steps taken to refuse a page lock to a process which has reached the process page lock limit. This causes abort of the SQL operation being performed, which in turn leads to termination of the process.

```
Lock_resource_unavailable PROCEDURE(page) return
    resource unavailable on the page lock.
    /= Assemble resource unavailable information to be
    returned to the SQL user =/
    Resource is page.
    Reason is violation of process lock limit.
    RETURN to abort routine in calling procedure.
    /= will cause this SQL operation to be aborted =/
END lock_resource_unavailable procedure.
```

The above code simply assembles the appropriate error information to be returned to the SQL user identifying violation of the process page lock limit as the reason for the operation being aborted. The code then enters a common abort path which is shared by all terminating error conditions.

Production of Page Lock Statistics

All processes ultimately reach a stage in their execution where they are committed and their data base updates are made permanent and visible to other processes, or they are aborted and their data base updates are backed out. At the end of commit or abort, all page locks held by the process, against all tablespaces, are released. This point marks the end of the scope of page locking for a process.

In order to give the installation information by which to manage its lock storage and concurrency, at commit or abort time for a process, implementation of the method of the invention produces page lock statistics which give the maximum number of page locks that the process held concurrently in each tablespace during the life of its execution.

These statistics are comparable to the tablespace lock escalation limit and the process page lock limit, respectively. The statistics are produced conditionally according to whether the user has requested them via the Performance Trace facility.

The following pseudo-code shows the steps taken to adjust the running page lock counts to reflect the page locks released, and then produces the page lock statistics if requested. This code is executed at commit or abort of a process.

```
IF lock performance trace is requested THEN
    copy process_maximum_page_lock_count to performance
    trace record.
DO for each tablespace accessed.
    Decrement the process_running_page_lock_count by the
        tablespace_running_page_lock_count.
        /= to account for locks released =/
    Reset the tablespace_running_page_lock_count to zero.
    IF lock performance trace is requested THEN
        copy tablespace_maximum_page_lock_count to
        performance trace record.
END.
IF lock performance trace is requested THEN
    write lock performance trace record.
    /= outputs statistics to user =/
```

The page lock statistics are immediately available from the process and tablespace maximum_page_lock_counts that were maintained in "Monitoring Usage of the Resource".

ILLUSTRATIVE EXAMPLES OF THE METHOD

Choosing the Starting Values for Lock Limits

The approach here is to choose starting values for the installation default lock escalation limit (IRLMLKTS) and the process page lock limit (IRLMLKUS), and then run with these starting limits where gathering the necessary page lock statistics by which to adjust to more optimal limits.

The key parameters involved in managing lock storage and concurrency are:

The amount of lock storage available to hold locks. This is determined by the installation as part of allocating its total system virtual storage to various functions. It is set as an installation parameter.

Note: Some amount of lock storage must be set aside for locking requirements of the system other than page locking. This is a fixed and relatively small amount compared to that required for data page locks.

The number of concurrently running processes that do page locking in one or more tablespaces.

The number of tablespaces with page locking protocols that can be concurrently accessed by a process.

A sample calculation to arrive at starting values for IRLMLKTS and IRLMLKUS would be as follows:

Assume 100K bytes of storage available for locks, five concurrent processes that can do page locking, and five tablespaces with page locking protocols that can be concurrently accessed by each process. IRLM requires approximately 200 bytes of storage to hold each lock.

Then

Total number of locks that can be concurrently held = 100K bytes/200 bytes per lock = 500.

IRLMLKUS number of page locks that can be concurrently held by one process = 500 total locks/5 concurrent processes = 100.

IRLMLKTS number of page locks that can be concurrently held in one tablespace by one process = 100 locks per process/5 tablespaces per process = 20.

This calculation allows for the condition where each process could accumulate exactly the lock escalation limit of page locks in each tablespace, thus consuming all of lock storage.

Locking Operation

Consider the locking operation with five concurrent processes, each accessing the same five tablespaces, with the lock limits calculated above. Assume the five tablespaces have locking protocols as follows:

| Tablespace | LOCKSIZE |
|---|---|
| A | ANY |
| B | ANY |
| C | ANY |
| D | PAGE |
| E | PAGE |

Assuming all processes start with page locking protocols to all tablespaces, then:

If any process accumulates 20 page locks in Tablespace A, B, or C, the locking protocol of that process to that tablespace will be escalated from 'page' to 'tablespace'. If exclusive access to the tablespace is needed, the escalating process will have to wait until the other concurrent processes are finished with the tablespace, i.e. their page locks are released. Once lock escalation successfully occurs, the 20 page locks held in the escalated tablespace are released and subtracted from the page lock count of the owning process.

Any process can accumulate page locks in Tablespace D or E up to 99. Those tablespaces have been deemed to have a high-concurrency requirement.

If any process accumulates 100 page locks, say 10, 10, 10, 20, 50 in A-E, it will be terminated. However, if this happens, an adjustment in lock parameters is called for to accommodate the process, since it is not acceptable to not be able to run a process.

The maximum number of page locks that are concurrently held by each process in each tablespace are collected, and are output as statistics at the end of execution.

Analyzing the Page Lock Statistics

Assume at the end of running the above processes that the page lock statistics produced were the following:

|  | Proc | Maximum Page Locks Held |  |  |  |  |
|---|---|---|---|---|---|---|
|  |  | Tablespace |  |  |  |  |
| Process | Total | A | B | C | D | E |
| 1 | 60 | 5 | 5 | 5 | 20 | 50 |
| 2 | 45 | 0 | 20* | 10 | 15 | 40 |
| 3 | 25 | 10 | 10 | 5 | 0 | 20 |
| 4 | 35 | 5 | 0 | 10 | 30 | 10 |
| 5 | 50 | 20* | 5 | 5 | 25 | 50 |

*indicates that lock escalation occurred.

In analyzing these statistics, the following points are significant:

None of the processes came close to the process page lock limit of 100. The maximum number of page locks that could have been concurrently held in total for the system was 215 (sum of the process maximums) versus the 500 capacity of lock storage. Therefore, lock storage was far under-utilized.

There was considerable difference in the levels of page locking among the processes.

Tablespaces A and B experienced lock escalation which, when it occurred, caused loss of concurrency on those tablespaces.

The use of Tablespace C by any process did not approach the lock escalation limit.

The next step is to adjust the lock limits toward more optimal balance of lock storage and concurrency. An optimal balance is achieved when:

Lock storage is fully utilized, or nearly so, as evidenced by all processes approaching their respective process page lock limits, but no process being terminated as a result of reaching the limit.

The sum of the page lock limits of concurrent processes should approximately equal the capacity of lock storage for page locks.

The locking protocol for tablespaces (LOCKSIZE PAGE or LOCKSIZE ANY) and the lock escalation limits for applicable tablespaces give the desired degree of concurrency to referencing processes, as determined by the installation. This means high-concurrency tablespaces have page locking protocols (LOCKSIZE PAGE) or high lock escalation limits (LOCKSIZE ANY LIMIT high—value), and lesser concurrency tablespaces have lower lock escalation limits, according to their degree of concurrency.

Adjusting the Locking Parameters

The following are alternative steps that could be taken to improve the balance in the example above:

Get more concurrency out of existing lock storage:
Since the two processes that hit the lock escalation limit on Tablespaces A and B both have extra page locking capacity, a suggested change would be to ALTER the locking protocol on those tablespaces to LOCKSIZE PAGE, and thereby allow them to be fully concurrent.

Run more processes concurrently, assuming other system resources allow it.

Having done either of these, the system should be run for a while to gather new page lock statistics by which to make further adjustments. In the case of this example, it may be that there is still excess locking capacity, which would then lead to the action that follows.

"Give back" unused lock storage and balance concurrency in the remaining storage:
Based on the processes as they are now executing, no more than 215 page locks are being concurrently held, which converts to 43K of lock storage (vs. the 100K originally allocated). Allowing some room for margin, 50K could be "given back" to the system to be used for other purposes. Lock storage may be changed in the method via the IRLMM-CSA installation parameter.

Based on the remaining amount of lock storage (50K), the default process page lock limit should be reduced to 50 and the default lock escalation limit reduced to 10 (via the IRLMLKUS and IRLMLKTS installation parameters in the method.

By setting individual limits for each process, a more balanced set that fits the concurrency needs of each process can be used versus the default. The constraint is that the sum of the process limits should not exceed the capacity of lock storage. Thus, a set of process page lock limits that fits the example above might be 70,50,30,40,60 for processes 1-5, i.e. 70+50+30+40+60=250 maximum page lock capacity. These limits can be set by rebinding the application plans for each process and specifying the LOCKLIMIT parameter. By setting individual process page lock limits, each process can more nearly be given the concurrency that it needs, but no more that it needs. But these choices of limits must be based on actual running experience to see what the locking pattern of each process is.

The lock escalation limits of Tablespaces A and B might also be tailored individually to best fit the processes that are using them the most concurrently. For instance, Tablespace C might have a lower escalation limit, say 15, in favor of A and B having higher ones, say 25. This choice too would have to be made based on actual further running experience.

We claim:

1. A computer method for managing granularity of lockable resources and concurrency of access among a plurality of asynchronous processes making references to said resources in a multiprocessing environment, said environment including a facility for selectively imposing a predetermined number of locks on resources of small granularity (page locks) and large granularity (table locks), the facility (1) granting a lock responsive to a request from a referencing process or system condition, (2) assigning said granted lock to the requesting process and the referenced lockable resource, and (3) maintaining a current count of the number and type of locks and their distribution by process and resource, comprising the steps of:
(a) establishing a first limit on the number of small granularity locks (page locks) which may be granted by the facility for each lockable resource, said first limit having a magnitude set consistent with an expectation of resource use among the processes making reference thereto, and establishing a second limit on the number of locks assignable per process;
(b) granting locks by the facility to requesting processes in an order determined by availability and request;
(c) upon a requesting process being granted a small granularity lock by the facility on a resource referenced by said process which would result in the number of said locks reaching the first limit for that resource,
  (c1) withdrawing the small granularity locks assigned to the referenced resource, and
  (c2) granting a large granularity lock (tablespace) on the resource to a predetermined one of the referencing processes; and
(d) upon a process requesting a lock, the grant of which would result in reaching the second limit, refusing the grant of the lock by the facility to said requesting process.

2. The method according to claim 1, wherein step (c2) further includes the step of granting said large granularity lock by the facility if the resource has a low-concurrency expectation of processes making reference thereto.

3. The method according to claim 1, wherein step (d) further includes the step of terminating the execution of said process.

4. A computer method for adjusting concurrency of asynchronous processes making reference to lockable resources, said method to be maintained within a finite amount of virtual lock storage space in a multiprocessing environment, said environment including a facility for selectively imposing a predetermined number of locks on resources of small granularity (page locks) and large granularity (table locks), the facility (1) granting a lock responsive to a request from a referencing process or system condition, (2) assigning said granted lock to the requesting process and the referenced lockable resource, and (3) maintaining a current count of the number and type of locks and their distribution by process and resource, comprising the steps of:
(a) responsive to a process making reference to one of the lockable resources, establishing a maximum level of sharing (lowest level of locking; i.e., page) of said one resource among processes making reference thereto consistent with an expectation of resource use, and establishing a limit on the number of locks assignable per referencing process;
(b) monitoring resource usage by referencing processes such that upon usage of any given process exceeding the expectation of resource use (i.e., number of page locks), then either:
  (b1) refusing to grant a low granularity lock by the facility to a requesting process if the result of granting said lock would be to impose a high-concurrency requirement (i.e., high number of page locks) on the resource being referenced by the requesting process, or
  (b2) granting a large granularity lock by the facility to a requesting process if the result of granting said lock would avoid imposing a high-concurrency requirement on the resource being referenced by the requesting process; and
(c) upon a requesting process being granted a lock by the facility and the number of locks concurrently held by that process reaching the limit, refusing the grant of the lock.

5. The method according to claim 4, wherein step (c) further includes the step of terminating the execution of said process.

* * * * *